United States Patent [19]

Halliday

[11] Patent Number: 5,334,978
[45] Date of Patent: Aug. 2, 1994

[54] MANCHESTER PATTERN FAULT RECOGNITION

[75] Inventor: Daniel L. Halliday, Granger, Ind.

[73] Assignee: Allied-Signal Inc., Morristown, N.J.

[21] Appl. No.: 967,583

[22] Filed: Oct. 28, 1992

[51] Int. Cl.$^5$ .............................................. H03M 5/12
[52] U.S. Cl. ......................................... 341/94; 341/70
[58] Field of Search .......................... 341/94, 97, 70; 371/5.4, 24, 30, 31, 37.7, 40.1, 40.2, 47.1, 65

[56] References Cited

U.S. PATENT DOCUMENTS

| | | | |
|---|---|---|---|
| 3,962,646 | 6/1976 | Tempka . | |
| 4,389,636 | 6/1983 | Riddle . | |
| 4,488,295 | 12/1984 | Sharper | 370/99 |
| 4,852,079 | 7/1989 | Kinney et al. | 370/3 |
| 5,004,910 | 4/1991 | Arnett | 250/226 |

OTHER PUBLICATIONS

IFEE Transactions on Vehicular Technology vol. 39, No. 2, May 1990, N.Y. Author: Wicker; Entitled: "Muting Algorithms Based on the Use of Side Information Generated by Error Control Systems".

*Primary Examiner*—Brian K. Young
*Attorney, Agent, or Firm*—Leo H. McCormick, Jr.; Larry J. Palguta; Robert A. Walsh

[57] ABSTRACT

A method for validating Manchester Encoded Gray Coded serial binary signals wherein the Manchester Encoded, Gray Coded data word is first tested for missing data bits by constructing first and second copies of the data word wherein the first copy has a one inserted in a position where a missing data bits is detected and the second copy has a zero inserted in a position where a missing data bit was detected. Thereafter, the first and second copies of the data word are then converted from Gray Code into corresponding coded binary words and the second binary word is subtracted from the first binary word to obtain an absolute value. Only when the absolute value is one is the missing bit the least significant and the received data word valid information.

6 Claims, 2 Drawing Sheets

MANCHESTER PATTERN FAULT RECOGNITION

SUMMARY OF THE INVENTION

The present invention relates to fiber optic transmission and reception of information from optical position sensors, and more particularly to a process for decoding such information.

In the present invention, a Gray Code is employed wherein any two successive (decimal) numbers differ from one another in only one bit position. Moreover, data words in that Gray Code are transmitted by so-called Manchester Encoding where a transition from one level to another represents a ZERO while a transition from the other level back represents a ONE.

The present invention represents improvements for the process and structure disclosed in copending U.S. Pat. No. 5,222,105 for detecting and decoding Manchester Encoded data of a type where each incoming data word is preceded by a multi-bit synchronization pattern. The technique of this copending application includes confirming the reception of a valid synchronization pattern and from that pattern determining the time duration of a received bit within that valid synchronization pattern. As an alternative, the bit duration may be predetermined at the receiving end. A permissible time window is then established from the determined time duration and data transitions occurring within that permissible window are sensed. Upon sensing a transition within the window, the time of that transition is reestablished to occur at the time at which it should have occurred according to the previously determined bit width. One bit may be indeterminate and the algorithm is structured to allow any one bit anywhere in the data stream to be missing. The missing bit may be set to either a ONE or a ZERO, but if, for example, two or more bits are missing, fault indication occurs. The steps of sensing and reestablishing are repeated for each data bit in a data word to thereby form a reconstructed data word.

When the missing bit detected in accordance with this prior technique is the least significant bit, little error is introduced by setting that bit to either a ZERO or to a ONE, but if it is, for example, the most significant digit, substantial error is introduced by accepting the data word as being valid.

In a Gray Code, the least significant bit position associated with an increase in magnitude differs from the least significant bit position associated with a decrease as in the following three bit example where the least significant bit position is indicated by "x".

| | | Least Significant Bit Position | | |
|---|---|---|---|---|
| Dec. | Binary | Gray Code | Increasing | Decreasing |
| 0 | 000 | 000 | 00x | x00 |
| 1 | 001 | 001 | ox0 | 00x |
| 2 | 010 | 011 | 00x | 0x0 |
| 3 | 011 | 010 | x00 | 00x |
| 4 | 100 | 110 | 00x | x00 |
| 5 | 101 | 111 | 0x0 | 00x |
| 6 | 110 | 101 | 00x | 0x0 |
| 7 | 111 | 100 | x00 | 00x |

It is accordingly a primary object of the present invention to determine whether or not a digit, detected as missing in a serial stream is a least or most significant digit.

In the above mentioned copending application, several synchronization bits (typically three) precede each data word generally providing high quality results. However, should the receiving circuitry fail to detect the first such synchronization bit, it then recognizes the first data bit as being the third of the synchronization bits. In the present invention, only a single synchronization pulse precedes each data word and another pulse follows the data word to provide both the timing information and location where the data word begins.

Accordingly, it is another object of the present invention to provide a method of determining the significance of bit in a received data word by analyzing an error signal and rejecting the data word whenever the received data is not of the forth of n data bits preceded and followed by single synchronization bits.

In general the presence invention discloses a method for determining the significance of a bit missing from a received data word includes the testing of the received data word to insure that no more than one bit is missing and the formation of two replicas of the received data word, one with a ONE in any missing bit position and the other with a ZERO in any missing bit position. One replica is then subtracted from the other to form a difference in the form $2^k$. The kth bit position is then identified as the missing bit position.

Further, one form of the invention discloses, a process of detecting, decoding and retiming optically transmitted wave division multiplexed Manchester Encoded data signals. In this process, all data words received are utilized even when an error is detected in the reception thereof. Usable data words are identified by sensing for errors in the form of missing bits and determining the position within a data word the location at which a detected error occurs. The data word will be accepted as a valid data word if, and only if, the only missing bit is the least significant bit. The sensing includes testing the received data to make sure not more than one bit is missing while the step of determining includes forming two replicas of the received data word, one with a ONE in any missing bit position and the other with a ZERO in any missing bit position and subtracting one replica from the other to form a difference of the form $2^k$, the data word being accepted as valid only if k=0 indicating that the bit position was the least significant.

The process of the present invention and advantages it offers should become evident from reading this specification while viewing the drawings.

BRIEF DESCRIPTION OF THE DRAWING

Corresponding reference characters indicate corresponding parts throughout the several views of the drawings.

DESCRIPTION OF THE PREFERRED EMBODIMENT

Figure 1:
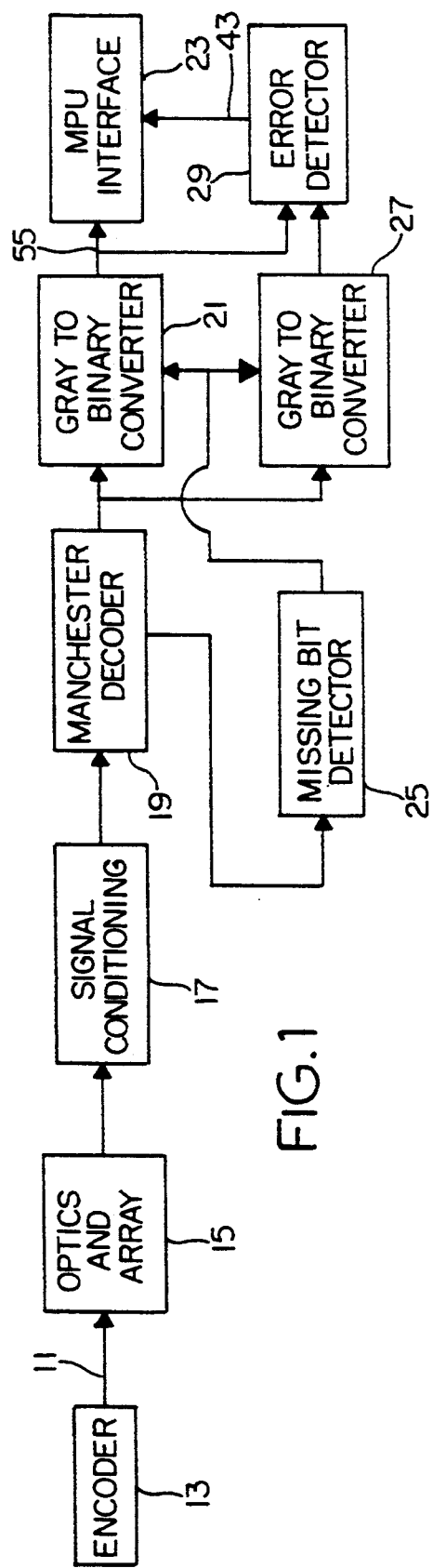
FIG. 1 is a generalized schematic block diagram of a system for encoding, transmitting and decoding information such as position information with emphasis on function.

Referring first to FIG. 1, the encoder 13 may be of the type disclosed in U.S. Pat. No. 5,004,910 wherein light is modified by an encoder disk on a rotating shaft to generate and transmit position information along a fiber optic path 11. The position information may be wave division multiplexed (individually modulated spectral elements) and the demultiplexing may be accomplished by the optics and array section 15, for example, as disclosed in the Kinney et al U.S. Pat. No. 4,852,079 entitled OPTICAL SPECTRUM ANALYZER. The signal conditioning circuit 17 may be a series of analog circuits as more completely described in the above mentioned copending U.S. Pat. No. 5,222,105. The conditioned signal is then decoded at 19 and converted to a binary code at 21 and forwarded to the MPU interface 23.

Figure 2:
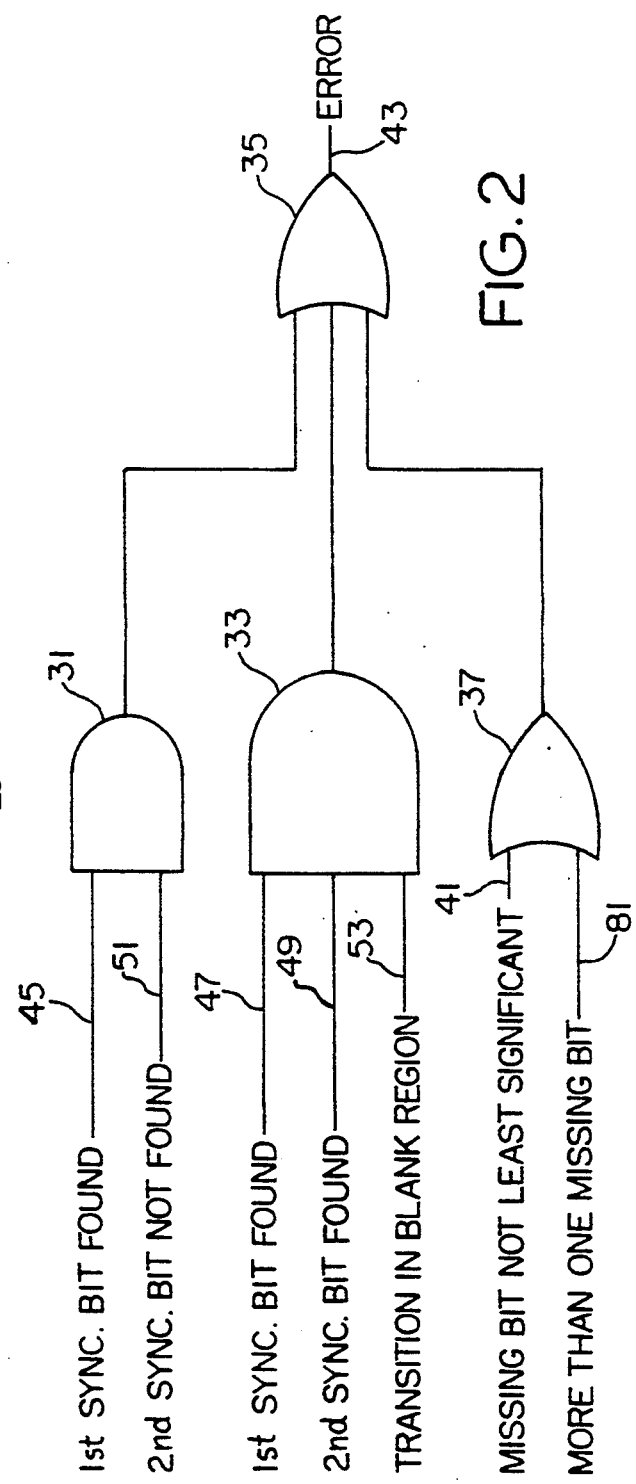
FIG. 2 is a more detailed schematic block diagram emphasizing the structure of a portion of the error detector circuit of FIG. 1.

If a received signal is not perceived as a data word, an error signal will appear on line 43 in the following way. Considering FIGS. 2 and 4, the process of identifying a received signal as a data word will be clear. A search is made for a single leading synchronization pulse (sync 1). If a single leading synchronization pulse is not found, a signal appears on line 45, conversely if such pulse is found, a signal appears on line 47. The next n transitions (low to high or high to low) are then sensed as data indicative transitions. Thereafter, a search is made for a trailing synchronizing transition (sync 2). IF a trailing synchronizing transition appears, a signal occurs on line 49 while the absence of such transition appears as a signal on line 51. Finally, a blank region, equal in length to one data bit, is sensed to insure the lack of any transitions (no edge). Should an edge occur in the blank region, a signal will appear on line 53. In summary, an error signal appears on line 43 from OR gate 35 if either both a first synchronization bit is found and a second is not (from AND gate 31), or both the first and second synchronization bits are found, but there is a transition in the blanking region (from AND gate 33). An error signal may also occur if OR gate 37 indicates either that there is more than one missing bit as signalled on line 81 from missing bit detector 25 or that the missing bit is not least significant, as indicated by line 41.

Figure 3:
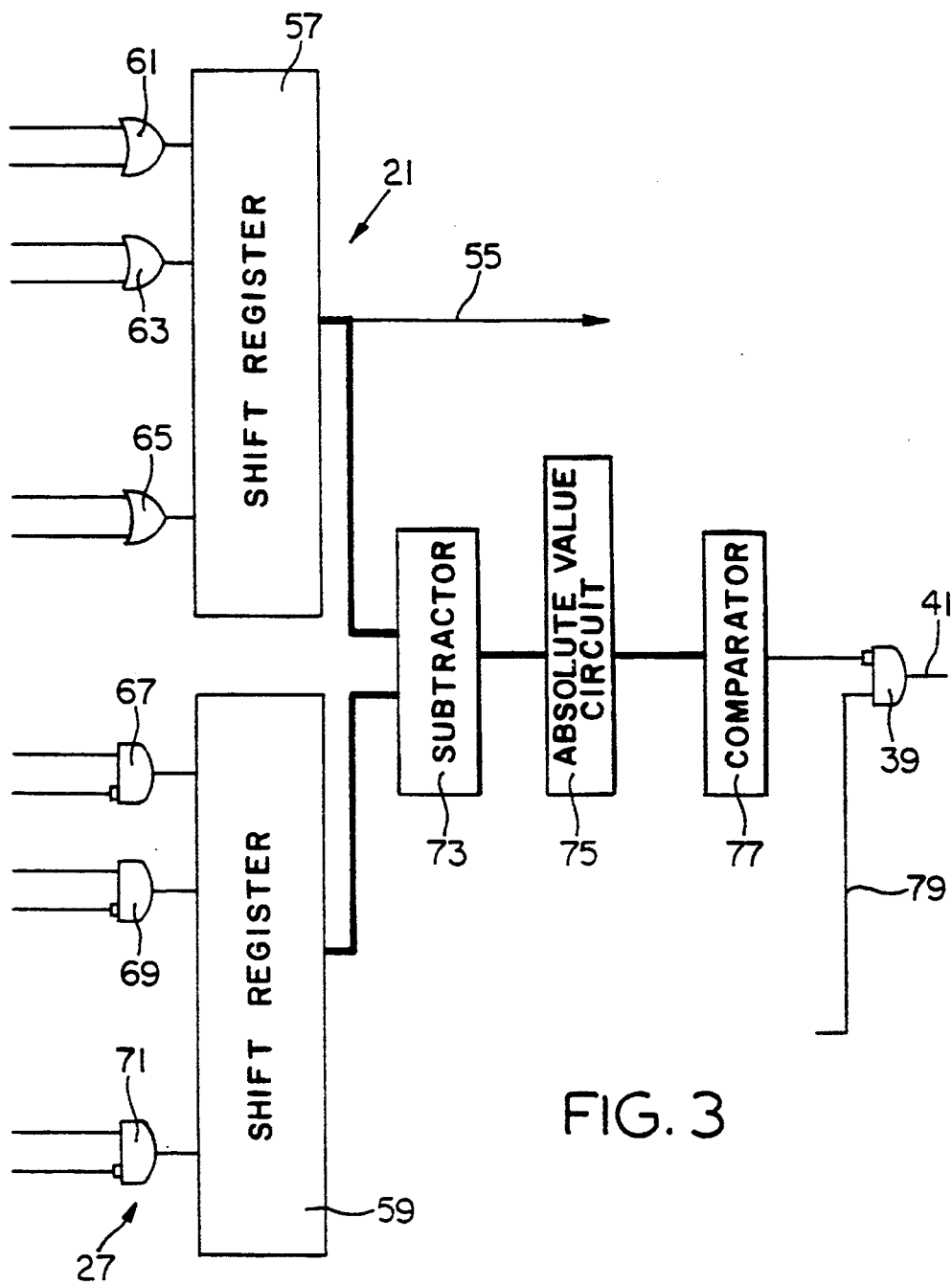
FIG. 3 is a more detailed schematic block diagram emphasizing the structure of the Gray to binary converter along with another portion of the error detector circuit of FIG. 1.

The details of the Gray to binary converters 21 and 27 as well as the origin of the least significant bit error on line 41 is most easily understood by comparing FIGS. 1 and 3. A received Manchester decoded (but still Gray coded) n bit word is passed from decoder 19 to the two Gray to binary converters 21 and 27. Each of the converters 21 and 27 have an n bit exclusive OR shift register 57 or 59 of conventional construction. The inputs to register 57 are from a series of n OR gates such as 61, 63 and 65. These gates receive the n bit word on the upper input lines. The register 59 receives its inputs from a series of n AND gates such as 67, 69 and 71. Again, the n gates receive the n bit decoded word on the upper lines. The n lower inputs to the OR gates are all ZERO except for any position where a missing bit has been detected by detector 25. Any missing bit position is set to a ONE. The same inputs are supplied to the lower lines to gates 67, 69 and 71, but are inverted at the inputs to those gates. The effect of this is to set the missing bit position to ONE for register 57 and to set the missing bit position to ZERO for register 59. These two values are subtracted from one another in subtractor 73 and the absolute value of the difference is supplied from circuit 75 to the comparator 77 where the absolute value of the difference is compared to ONE. If that comparison indicates a value of more than ONE and only one bit is missing as indicated by a signal on line 79 from detector 25, an error signal is supplied on line 41 to the circuit of FIG. 2.

Figure 4:
FIG. 4 is an illustrative waveform of a Manchester Encoded data word with synchronization bits preceding and following.

In summary, the n transitions of a waveform such as in FIG. 4 are tested by circuit 25 for errors in the form of missing bits. These n transitions are converted into an n-bit data word by decoder 19. Circuit 25 also determines the position within a data word at which a detected error occurs. Actually, the received n transitions are tested to make sure not more than one bit is missing. Two replicas of the n-bit data word are formed, one with a ONE in any missing bit position and the other with a ZERO in any missing bit position. Subtracting one replica from the other form a difference of the form $2^k$ and the received signal being accepted as representing a valid data word only if k=0, that is, if, and only if, the only missing bit is the least significant bit. The absolute value of the difference at the output of 75 indicates the position of a single missing bit. This output is $2^k$, where the kth bit position (counting up from the least significant) is the missing one.

What is claimed is:

1. A method of detecting and decoding a received Manchester Encoded, Gray Coded data word signal comprising the steps of:
   testing the Manchester Encoded, Gray Coded data word for missing data bits;
   constructing first and second copies of said data word which differ from one another only in the bit positions where a missing data bit was discovered during said testing step, said first constructed data word having a ONE in the missing data bit position and said second constructed having a ZERO in the missing data bit position;
   converting said first and second copies of said data word from Gray Code into corresponding first and second coded binary words;
   subtracting said first coded binary work from said second coded binary word to obtain an absolute value; and
   selecting either of said first and second binary coded binary words as valid information representing the received data word and the missing data bit as being the least significant if the absolute value of the difference computed in the step of subtracting is one otherwise rejecting the received data word as invalid.

2. The method of determining the significance of a bit missing from a received data word comprising the steps of;
   testing the received data word to insure that no more than one bit is missing;
   forming first and second replicas of the received data word, said first replica having a ONE in the missing bit position and said second replica having a ZERO in the missing bit position;
   subtracting said first replica from said second replica to form an absolute difference; and
   identifying the missing bit position as being the least significant if the absolute difference is one.

3. The process of identifying a received signal as a data word comprising the steps of;
   detecting for a single leading synchronizing pulse of the data word;
   detecting for transitions in the data word;

detecting for a trailing synchronizing pulse of the data word;

detecting for a blank of the data word;

testing to determine the lack of any transitions within one bit time period until receipt of the trailing synchronizing pulse;

detecting for missing data bits in the transitions of the data word; and accepting the information in the data word if the missing data bits are the least significant bit.

4. The process of claim 3 including the additional steps of testing the transitions for errors in the form of missing bits, converting the transitions into a data word, determining the position within the data word at which a detected error occurs, and accepting as valid the data word if, and only if, the only missing bit is the least significant bit.

5. The process as recited in claim 4 wherein the step of testing includes testing the received transitions to make sure not more than one bit is missing; and the step of determining includes forming first and second replicas of the data word, said first replica having a ONE in any missing bit position and said second replica having a ZERO in any missing bit position and subtracting said first replica from said second replica to find a difference, the received signal being accepted as representing a valid data word only if the difference is one.

6. A process of receiving and validating data words to detect errors in the reception thereof comprising:

detecting for errors in the form of missing bits;

testing a received data word to make sure not more than one bit is missing;

determining the position within the data word at which a detected error occurs by forming two replicas of the received data word, one replica having a One in the missing bit position and the other replica having a Zero in the missing bit position and subtracting one replica from the other to find a difference and accepting the data word only if the difference is one; and accepting as valid the data word if, and only if, the only missing bit is the least significant bit.

* * * * *